(12) United States Patent
Chen et al.

(10) Patent No.: US 9,931,813 B2
(45) Date of Patent: Apr. 3, 2018

(54) BONDING STRUCTURE AND METHOD OF FABRICATING THE SAME

(75) Inventors: Kuan-Neng Chen, Taipei County (TW); Wei-Chung Lo, Taipei (TW); Cheng-Ta Ko, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 825 days.

(21) Appl. No.: 12/774,731

(22) Filed: May 6, 2010

(65) Prior Publication Data

US 2011/0195273 A1 Aug. 11, 2011

(30) Foreign Application Priority Data

Feb. 6, 2010 (TW) .............................. 99103648 A (51) Int. Cl.
| | |
|---|---|
| *B32B 15/01* | (2006.01) |
| *B32B 9/04* | (2006.01) |
| *B32B 7/04* | (2006.01) |
| *B32B 7/12* | (2006.01) |
| *B32B 9/00* | (2006.01) |
| *B32B 27/28* | (2006.01) |
| *B32B 3/08* | (2006.01) |

(52) U.S. Cl.
CPC .................. *B32B 9/04* (2013.01); *B32B 3/08* (2013.01); *B32B 7/04* (2013.01); *B32B 7/12* (2013.01); *B32B 9/00* (2013.01); *B32B 15/01* (2013.01); *B32B 27/283* (2013.01); *B32B 2307/714* (2013.01); *Y10T 156/10* (2015.01); *Y10T 428/12771* (2015.01); *Y10T 428/31678* (2015.04)

(58) Field of Classification Search
None
See application file for complete search history.

(56) References Cited

U.S. PATENT DOCUMENTS

| | | | | |
|---|---|---|---|---|
| 3,745,094 | A * | 7/1973 | Greene | .......................... 205/123 |
| 4,678,637 | A * | 7/1987 | Duerrschnabel | .......... C22C 9/00 |
| | | | | 257/E23.053 |
| 4,717,591 | A * | 1/1988 | Acosta | .................... C23C 30/00 |
| | | | | 427/437 |

(Continued)

FOREIGN PATENT DOCUMENTS

| | | |
|---|---|---|
| TW | 200625486 | 7/2006 |
| TW | 200707640 | 2/2007 |
| TW | I292922 | 1/2008 |

OTHER PUBLICATIONS

Ahmed M. Abdul-Lettif, Investigation of interdiffusion in copper-nickel bilayer thin films, Physica B 388 (2007) 107-111.*

(Continued)

*Primary Examiner* — Adam Krupicka
(74) *Attorney, Agent, or Firm* — Finnegan, Henderson, Farabow, Garrett & Dunner LLP (57) ABSTRACT

A bonding structure and a method of fabricating the same are provided. A first substrate having a first bonding element and a second substrate having a second bonding element are provided, wherein at least one of the first bonding element and the second bonding element is formed with an alloy. A bonding process is performed to bond the first bonding element with the second bonding element, wherein a diffusion liner is generated at the exposed, non-bonded surface of the bonding structure.

18 Claims, 5 Drawing Sheets

(56) References Cited

U.S. PATENT DOCUMENTS

| | | | | |
|---|---|---|---|---|
| 4,810,332 | A * | 3/1989 | Pan | 205/125 |
| 4,810,468 | A * | 3/1989 | Duerrschnabel et al. | 420/490 |
| 2002/0070400 | A1* | 6/2002 | Shibuya | H01L 23/49822 257/296 |
| 2004/0166659 | A1* | 8/2004 | Lin | H01L 21/768 438/611 |
| 2009/0102003 | A1* | 4/2009 | Vogt et al. | 257/433 |
| 2009/0174070 | A1* | 7/2009 | Ramanathan et al. | 257/737 |
| 2009/0267213 | A1* | 10/2009 | Lin et al. | 257/687 |

OTHER PUBLICATIONS

Authored by Tsukimoto, et al., article titled "Formation of Ti Diffusion Barrier Layers in Thin Cu(Ti) Alloy Films," adopted from Journal of Electronic Materials, vol. 34 No. 5, 2005, pp. 592-599.
"Office Action of Taiwan Counterpart Application", dated Apr. 30, 2013, p. 1-p. 10.

* cited by examiner

BONDING STRUCTURE AND METHOD OF FABRICATING THE SAME

CROSS-REFERENCE TO RELATED APPLICATION

This application claims the priority benefit of Taiwan application serial no. 99103648, filed Feb. 6, 2010. The entirety of the above-mentioned patent application is hereby incorporated by reference herein and made a part of specification.

BACKGROUND OF THE INVENTION

Technical Field

The disclosure relates to a bonding structure and a method of fabricating the same, and more particularly to a bonding structure in which the reliability of the bonding structure is enhanced and a method of fabricating the same.

Background

As the requirement on the complexity and precision of an integrated circuit design continues to increase, various techniques for reducing the feature size of a semiconductor device and/or increasing the integration of an integrated circuit are being explored. The fabrications of high-density metal interconnect and three-dimensional integrated circuits (3D-IC) have been proven to be feasible approaches for upgrading the integration density and improving the performance of semiconductor products.

Conventionally, copper are used in conductive lines for connecting semiconductor devices to a substrate or bonding metal for stacking chips or wafers to achieve 3D-IC configurations. However, the application of these metal bonding structures suffers some adverse challenges which are yet to be overcome.

Figure 1:
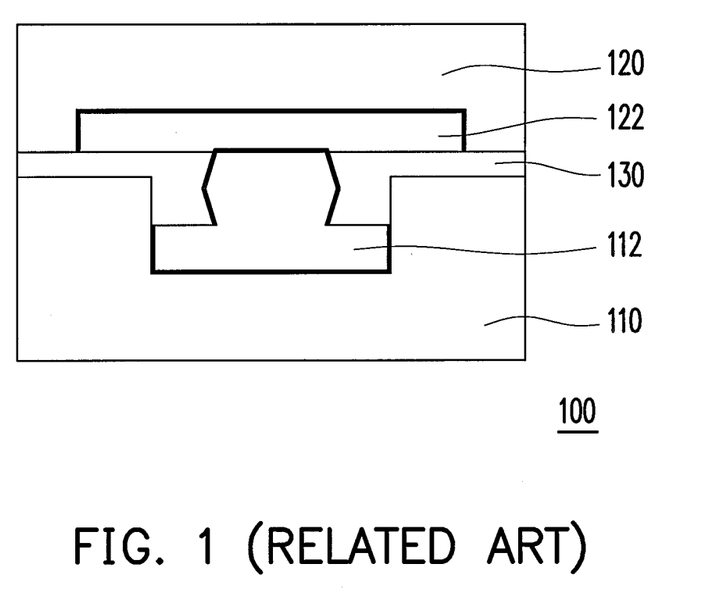
FIG. 1 is a schematic cross-sectional view illustrating a conventional bonding structure.

FIG. 1 is a schematic cross-sectional view illustrating a conventional bonding structure. Referring to FIG. 1, the bonding structure 100 mainly includes a first substrate 110 and a second substrate 120. The first substrate 110 includes a first bonding element 112 disposed thereon. Likewise, the second substrate 120 includes a second bonding element 122 disposed thereon. The first and the second bonding elements 112, 122 are composed of a metal, such as copper. As a bonding process is performed on the substrates 110 and 120, the first and the second bonding elements 112 and 122 are bonded together, such that the first substrate 110 is connected to the second substrate 120. Alternatively, an adhesive film 130 may be formed between the first and the second substrates 110, 120, enclosing the bonding structure.

As shown in FIG. 1, after the bonding process, the resulting bonding structure remains exposed to the ambient environment, such as air, or in contact with the adhesive film 130, which frequently causes damages to the bonding structure. A formation of a nonconductive oxide film on the surface of the bonding structure may also occur, and the presence of the nonconductive oxide film would lead to a high contact resistance in the device. Moreover, when integration increases, stress-induced voiding and electromigration often happen, especially in an exposed metal surface; hence, device failure is resulted. Further, as the feature size of a bonding pad or a contact becomes smaller and the level of interconnections continues to increase, the above-mentioned problems affecting a bonding structure become even more significant. Ultimately, the reliability of the bonding structure and the final device are impacted negatively.

SUMMARY

The disclosure is directed to a bonding structure for integrating two substrates. The bonding structure includes a diffusion liner at the exposed, non-bonded surface thereof. Therefore, the resistance to oxidation, electromigration and stress-induced voiding is improved.

The disclosure is also directed to a method of fabricating a bonding structure. The method includes forming a diffusion liner layer at the exposed, non-bonded surface of the bonding structure. Thus, the reliability of the bonding structure and the final device is enhanced.

The disclosure provides a bonding structure including a first substrate having at least a first bonding element, and a second substrate having at least a second bonding element. At least one of the first bonding element and the second bonding element is formed with an alloy having at least two metal components. The bonding structure further includes a diffusion liner layer configured at the exposed, non-bonded surface of the resulting bonding structure when the first bonding element is fused with the second bonding element, wherein the diffusion liner layer is constituted essentially with the at least two metal components used in forming the first bonding element and the second bonding element.

According to an exemplary embodiment of the disclosure, the concentrations of the at least two metal components in the diffusion liner layer is different from the concentrations of the at least two metal components in the at least one bonding element.

According to an exemplary embodiment of the disclosure, the weight percentage of one metal component of the at least two metal components in the at least one bonding element is between about 0.5% to about 15%, while the weight percentage of the same one metal component of the at least two metal components in the diffusion liner layer is greater than 95%.

According to an exemplary embodiment of the disclosure, the alloy is a copper-based alloy.

According to an exemplary embodiment of the disclosure, a secondary component in the alloy includes at least one of aluminum, titanium, magnesium and chromium.

According to an exemplary embodiment of the disclosure, an adhesive layer is sandwiched between the first and the second substrates for filling the gap therebetween.

The disclosure further provides a method of fabricating a bonding structure. The method includes providing a first substrate and a second substrate. The first substrate includes at least a first bonding element and the second substrate includes at least a second bonding element, wherein at least one of the first bonding element and the second bonding element is formed with an alloy including at least two metal components. A bonding process is then performed to fuse the first bonding element and the second bonding element and to generate a diffusion liner at an exposed, non-bonded surface of the resulting bonding structure.

According to an exemplary embodiment of the disclosure, the diffusion liner is formed with the at least two metal components from the at least one bonding element.

According to an exemplary embodiment of the disclosure, the concentrations of the at least two metal components in the diffusion liner layer is different from the concentrations of the at least two metal components in the at least one bonding element.

According to an exemplary embodiment of the disclosure, after the bonding process, an annealing process is performed.

According to an exemplary embodiment of the disclosure, the bonding process is performed at a temperature of about 300° C. to about 500° C. for about 30 minutes to about 120 minutes.

According to an exemplary embodiment of the disclosure, the bonding process includes a one-step bonding process or a two-step bonding-plus-annealing process.

According to an exemplary embodiment of the disclosure, at least one of the first bonding element and the second bonding element is formed with a copper-based alloy that includes at least one of aluminum, titanium, magnesium and chromium.

According to an exemplary embodiment of the disclosure, the method also includes forming an adhesive film, sandwiched in the gap between the first substrate and the second substrate.

Several exemplary embodiments accompanied with figures are described in detail below to further describe the disclosure in details.

DETAILED DESCRIPTION OF DISCLOSED EMBODIMENTS

In the following description, reference is made to various exemplary embodiments in which the disclosure may be practiced, and it is to be understood that other embodiments may be employed without departing from the disclosure. The disclosure is not limited to a particular form of bonding structure, and is applicable to any bonding structure, such as conductive wires, bumps, balls, pads, pins, or the like. However, to facilitate the explanation of the disclosure, the following discussion is exemplified with a lock-and-key bonding structure. Further, the disclosure is applicable for all types of semiconductor wafers, integrated circuit (IC) chip and wafer assembly. For example, the bonding structure of the disclosure can be applied to bond integrated circuits (IC) or chip to a substrate or to interconnect chips or wafers in a three-dimensional (3-D) integrated circuit assembly.

First Embodiment

Figure 2A:
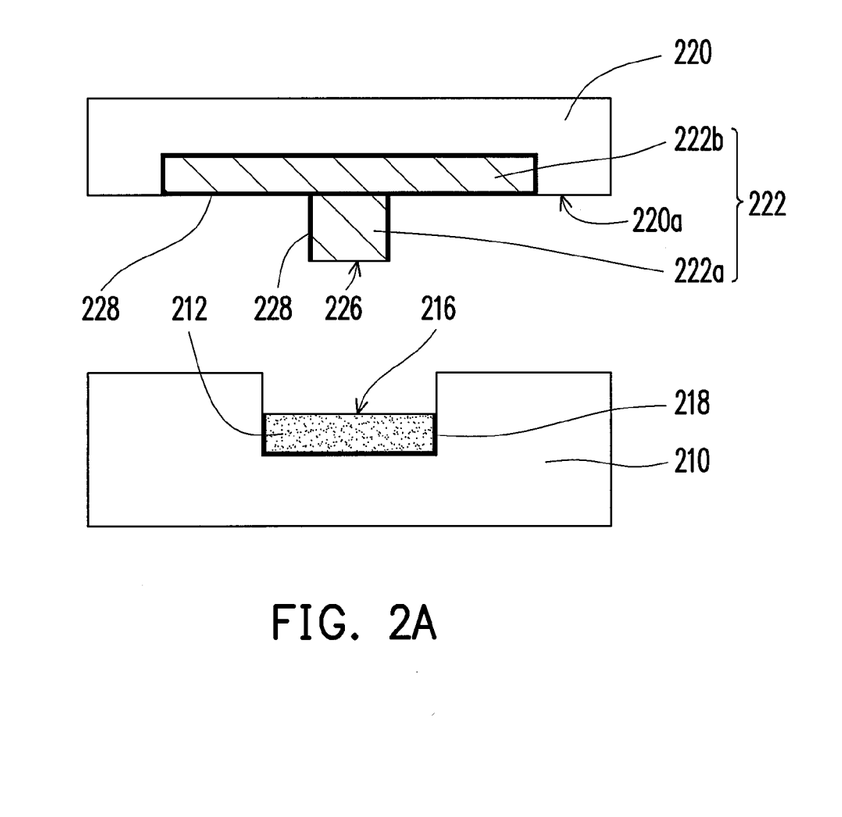
FIGS. 2A and 2B are schematic cross-sectional views illustrating a method of fabricating a bonding structure according to an exemplary embodiment of the disclosure.
Figure 2B:
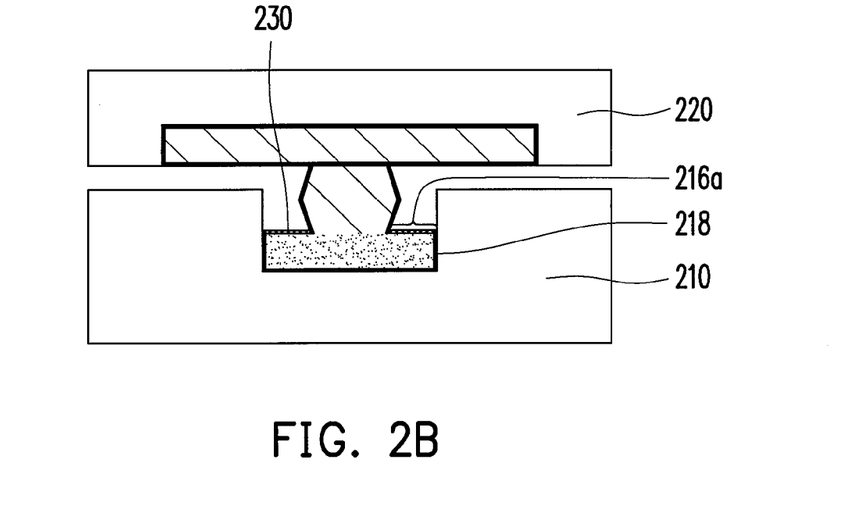

FIGS. 2A to 2B are schematic cross-sectional views illustrating a method of fabricating a bonding structure according to an exemplary embodiment of the disclosure. Referring to FIG. 2A, a first substrate 210 and a second substrate 220 are provided. The term "substrate" used in the discussion refers to any supporting structure, such as a semiconductor substrate, silicon-on-insulator, epitaxial layers of silicon supported on a base and other semiconductor structures made of silicon, germanium, germanium silicon, gallium arsenide, or the like materials. The "substrate" can also be a silicon wafer in a wafer bonding process. Further, the first substrate 210 and the second substrate 220 may include an active layer supporting one or more integrated circuit (IC) devices (not shown). As shown in FIG. 2A, the first substrate 210 includes at least a first bonding element 212, and the second substrate 220 includes at least a second bonding element 222. The second substrate 220 is configured above the first substrate 210 to be integrated with the first substrate 210.

In this exemplary embodiment of the disclosure, the first bonding element 212 is, for example, a metallized via extending downward into the first substrate 210. The metallized via 212 could be in electrical communication with integrated circuit (IC) devices (not shown) already formed on the first substrate 210 or electrically isolated from the IC devices (not shown) on the first substrate 210. It should be understood that the metallized via 212 could have any appropriate thickness and any polygonal shape. Further, the bonding surface 216 of the metallized via 212 could be flat, protruded or recessed. It should also be understood that the metallized via 212 may be formed in a dielectric medium (not shown) supported on a substrate.

The first bonding element 212 is formed by, for example, etching the first substrate 210 to form a recess and allowing the recess to be partially filled with a bonding material. Further, a liner layer 218 may be formed on the surface of the recess prior to filling the recess with the bonding material. In this exemplary embodiment of the disclosure, only the bonding surface 216 is not covered by the liner layer 218. The material of the liner layer 218 includes, for example, tantalum (Ta), tantalum nitride (TaN), titanium (Ti), titanium nitride (TiN) or titanium tungsten (TiW).

In this exemplary embodiment of the disclosure, the bonding material is a metal alloy having two or more components. In an exemplary embodiment of the disclosure, the metal alloy is a copper alloy, for example. The metal alloy also contains a secondary component that includes, but not limited to, titanium (Ti), magnesium (Mg), aluminum (Al), chromium (Cr). Further, the principle component in the metal alloy (such as, copper in a copper-based alloy) is about 85% to about 99.5% by weight, for example, while the secondary component in the metal alloy is about 15% to about 0.5% by weight, for example.

In this exemplary embodiment of the disclosure, the second bonding element 222 is a T-shaped structure which includes a stud 222a protruding above the top surface 220a of the second substrate 220 and a lateral portion 222b embedded at the top surface 220a of the second substrate 220, as shown in FIG. 2A. The second bonding element 222 is formed with a metal, such as copper.

According to an exemplary embodiment of the disclosure, a liner layer 228 may be formed between the second bonding element 222 and the second substrate 220, between the stud 222a and the lateral portion 222b, and on the exposed, non-bonding surfaces of the second bonding element 222. Please note that only the bonding surface 226 is not covered by the liner layer 228. The material of the liner layer 228 includes, for example, tantalum (Ta), tantalum nitride (TaN), titanium (Ti), titanium nitride (TiN) or titanium tungsten (TiW).

Referring to FIG. 2B, the second bonding element 222 on the second substrate 220 is brought into alignment and in contact with the first bonding element 212 on the first substrate 210. A bonding process is performed to integrate the first substrate 210 with the second substrate 220 through the physical bonding of the first bonding element 212 and the second bonding element 222. The bonding process includes a thermal process. In an exemplary embodiment of the disclosure, the thermal process is conducted at a temperature of about 300° C. to about 500° C. for at least 30 minutes. In another exemplary embodiment of the disclosure, the thermal process is conducted at a temperature between about 350° C. to about 400° C., and the duration of the thermal process ranges from 30 minutes to 2 hours. Depending on the requisite of the fabrication process, an annealing process may be performed subsequent to the bonding process to enhance the bonding quality of the first bonding element 212 and the second bonding element 222.

According to this exemplary embodiment of the disclosure, during the bonding process or the annealing process for promoting the bonding quality of the first bonding element 212 and the second bonding element 222, a diffusion liner layer 230 is generated at the exposed, non-bonded or non-bonding surfaces of the bonding elements. More specifically, in this exemplary embodiment of the disclosure, a diffusion liner layer 230 is generated at the non-bonded surface 216a of the bonding surface 216 of the first bonding element 212. In accordance to the embodiment of the disclosure, the self-forming diffusion liner layer 230 consists mostly of some of the metal components of the metal alloy used in forming the bonding elements. In an exemplary embodiment of the disclosure, in which the metal alloy is a copper-based alloy containing a secondary component of titanium (Ti), the diffusion liner layer 230 is formed mostly with titanium. However, it should be appreciated that the secondary component may also include magnesium, aluminum, chromium, and/or other metals, and the diffusion liner layer 230 may form mostly of magnesium, aluminum, chromium, and/or other metals.

The formation of the self-forming diffusion liner layer 230 may probably due to a segregation of the metal components (for example, copper and titanium) in the metal alloy at the elevated temperature and an aggregation of the one or more metal components in the alloy (for example, titanium) at the exposed, non-bonded surface 216a of the first bonding element 212. Alternatively speaking, the concentrations of the at least two metal components (for example, copper and titanium) in the diffusion liner layer 230 may be different from the concentrations of the at least two metal components (for example, copper and titanium) at a bulk of the first bonding element 212. For example, since most of the secondary metal component may have already migrated to the surface of first bonding element 212 subsequent to the bonding or the bonding plus annealing, the content of secondary metal component contained in the bulk of the first bonding element may be lower. When the first bonding element 212 is a copper-titanium alloy in which the weight percentage of secondary metal component, titanium, may be about 5% or less by weight, the weight percentage of titanium in the self-forming diffusion liner layer 230 may be, for example, at least greater than 95%.

Further, according to the exemplary embodiment of the disclosure, the bonding process may be a one-step bonding process or a two-step bonding-plus-annealing process, depending on the types of metal alloy used in forming the bonding elements and/or other fabrication process requirements.

The so-called one-step bonding process is applicable when the formation temperature of the diffusion liner layer is substantially similar to the bonding temperature range. Accordingly, the bonding interface and the diffusion linear layer are concurrently formed during the bonding process.

In the one-step bonding process, the bonding interface and the diffusion liner layer 230 are formed concurrently because the diffusion liner formation temperature is within the range of the bonding temperature. The one-step bonding process may be performed at a temperature of about 300° C. to 500° C. for at least 30 minutes, for example. Alternatively, the one-step bonding process may be performed at about 350° C. to about 400° C. for about 30 minutes to 120 minutes.

The so-called two-step bonding-plus-annealing process is applicable when the formation temperature of the diffusion liner layer is higher than the bonding temperature range, in which a bonding interface is first formed at the bonding temperature in the bonding process, and the diffusion liner layer is formed in the subsequent annealing process as the temperature increases to the diffusion linear layer formation temperature; accordingly, the bonding quality may also be improved.

In another exemplary embodiment of the disclosure, in the two-step bonding-plus-annealing process, depending on the types of metal alloy being applied, the bonding interface is formed at the bonding temperature during a step of the two-step process, and the diffusion liner layer is formed at the diffusion liner formation temperature in another step of the two-step process. Moreover, the two-step bonding-plus-annealing process improves the bonding quality of the bonding structure. The first step of the two-step bonding-plus-annealing process may be conducted, for example, for about 30 minutes to about 60 minutes, at a temperature between about 300° C. to 500° C. or between about 350° C. to 400° C. The second step of the two-step bonding-plus-annealing process may be conducted, for example, for about 60 minutes to about 120 minutes, at a temperature between about 300° C. to 500° C. or between about 350° C. to 400° C. The first and the second steps of the two-step bonding-plus-annealing process may be performed in a same chamber or different chambers.

Figure 3A:
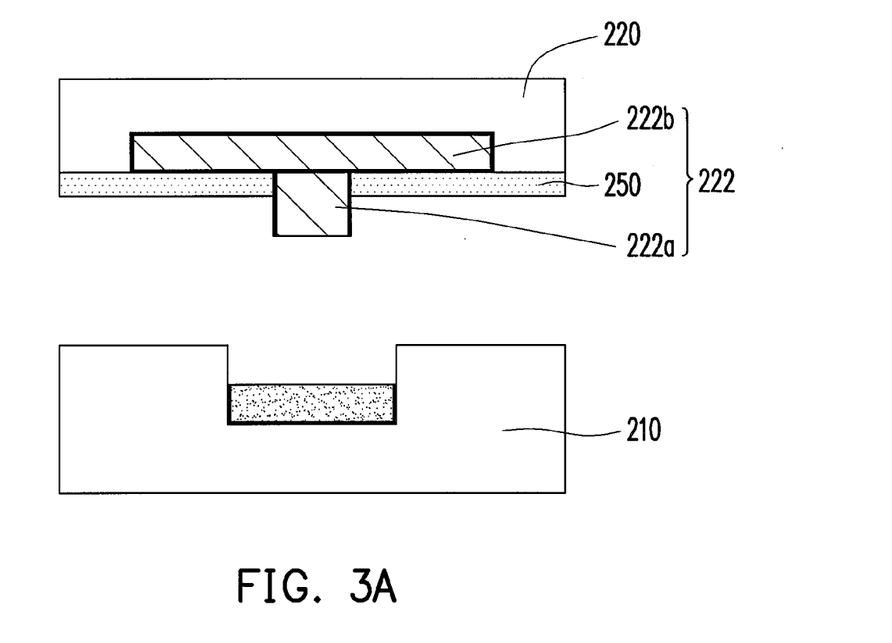
FIGS. 3A and 3B are schematic cross-sectional views illustrating a process of fabricating a bonding structure according to an exemplary embodiment of the disclosure.
Figure 3B:
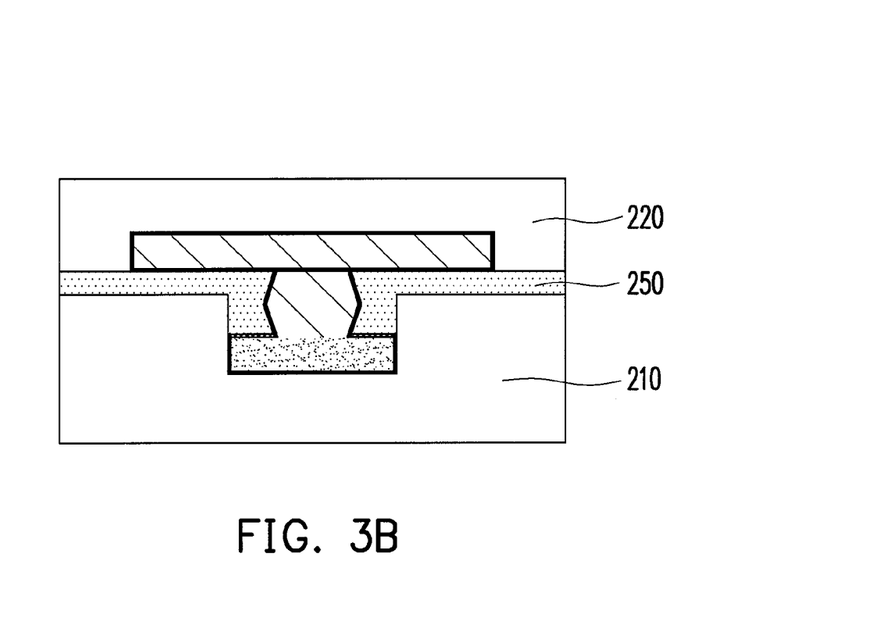

In accordance to an exemplary embodiment, prior to the bonding process, an adhesive film 250 may be applied on top surface 220a of the second substrate 220 surrounding the stud 222a, as shown in FIG. 3A. In this exemplary embodiment of the disclosure, the adhesive film 250 is formed on the lateral portion 222b of the second bonding element 222 and the top surface 220a of the second substrate 220. Hence, subsequent to the bonding process, as shown in FIG. 3B, the gap between the first substrate 210 and the second substrate 220 is filled with the adhesive film 250 to further enhance the bonding integrity of the bonding structure.

Second Embodiment

Figure 4A:
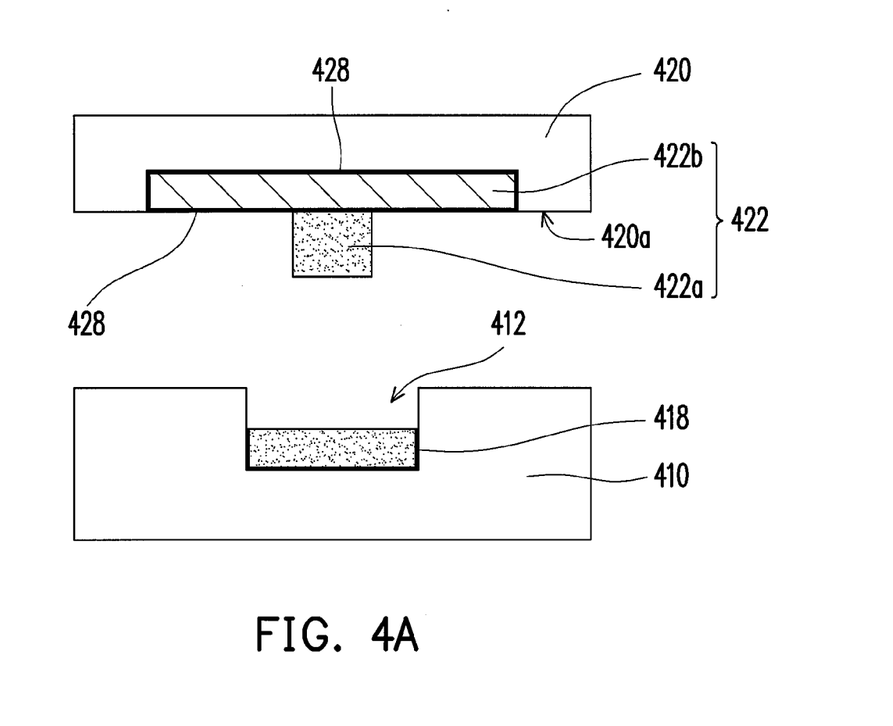
FIGS. 4A to 4B are schematic cross-sectional views illustrating a method of fabricating a bonding structure according to an exemplary embodiment of the disclosure.
Figure 4B:
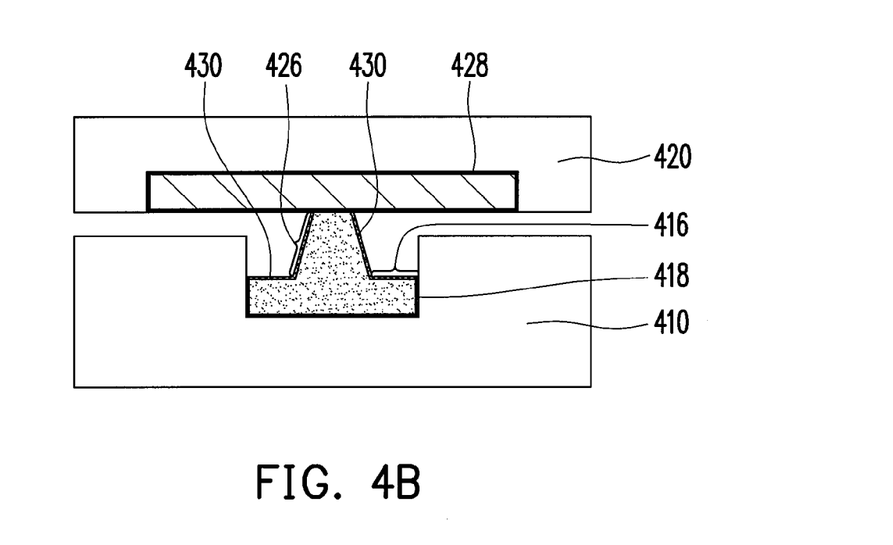

FIGS. 4A to 4B are schematic cross-sectional views illustrating a method of fabricating a bonding structure according to another exemplary embodiment of the disclosure. Similar to the first exemplary embodiment, a first substrate 410 including at least a first bonding element 412, and a second substrate 420 includes at least a second bonding element 422 are provided. In this exemplary embodiment of the disclosure, the first bonding element 412 is configured in a form of, for example, a metallized via created in the first substrate 410, while the second bonding element 422 is configured in a form of for example, a T-shaped structure with a stud 422a protruding above the top surface 420a of the second substrate 420 and a lateral portion 422b embedded at the top surface 420a of the second substrate 420. A liner layer 418 may be formed between the non-bonding surfaces of the first bonding element 412 and the first substrate 410. Additionally, a liner layer 428 may be formed between the second bonding element 422 and the second substrate 420, between the stud 222a and the lateral portion 222b, and on some of the exposed non-bonding surface of the bonding element 422. In accordance to this exemplary embodiment of the disclosure, the lateral portion 422b of the bonding element 422 is covered by the liner layer 428, while all surfaces of the stud 422a of the second bonding element 422 are not covered by the diffusion liner layer 428. The material of the liner layer 218 includes, for example, tantalum (Ta), tantalum nitride (TaN), titanium (Ti), titanium nitride (TiN) or titanium tungsten (TiW).

In this exemplary embodiment, the metallized via 412 is formed with a metal alloy having two or more metal components. Further, at least the stud 422a of the second bonding element 422 is formed with a metal alloy having two or more components. In an exemplary embodiment of the disclosure, the metal alloy used in forming the first metallized via 412 and the stud 422a is a copper-based alloy, for example. The copper-based alloy further includes a secondary component that includes one or more of titanium (Ti), magnesium (Mg), aluminum (Al) or chromium (Cr), for example. In this exemplary embodiment of the disclosure, the concentration of the primary component (for example, copper) in the metal alloy may be for example, about 85% to 99.5% by weight, while the concentration of the secondary component (for example, titanium) may be, for example about 15% to 0.5% by weight. The lateral portion 422b of the second bonding element 422 may form with copper or the above-mentioned copper alloy.

Continuing to FIG. 4B, the stud 422a of the second bonding element 422 is brought into alignment and in contact with the metallized via 412, and a bonding process is performed to connect the first substrate 410 with the second substrate 420. The bonding process includes a thermal process, for example. The thermal process may be conducted at a temperature of about 300° C. to about 500° C. for at least 30 minutes. Alternatively, the thermal process may be conducted at a temperature of about 350° C. to about 400° C., and the duration of the thermal process may range from about 30 minutes to about 2 hours. Depending on the requisite of the fabrication process, an annealing process may be performed subsequent to the bonding process to enhance the bonding quality of the first bonding element 412 and the second bonding element 422.

The bonding process may be a one-step bonding process or a two-step bonding-plus-annealing process.

Still referring to FIG. 4B, during the bonding process, a diffusion liner layer 430 is formed at the exposed, non-bonded surfaces of the first bonding element 412 and the second bonding element 422. More specifically, the self-forming diffusion liner layer 430 is formed at the exposed non-bonded surface 416 of the bonding surface of the first bonding element 412 and at the exposed non-bonding surfaces 426 of the stud 422a of the second bonding element 422. According to this exemplary embodiment of the disclosure, the self-forming diffusion liner layer 430 is generated mostly with the metal components of the metal alloy used in forming the first and the second bonding elements 412, 422. For example, the self-forming diffusion liner layer 430 may be formed with the secondary metal component of the metal alloy (for example, Ti in a Cu—Ti alloy) at the exposed, non-bonded surfaces 416, 426 of the first bonding element 412 and the second bonding element 422. Alternatively speaking, the concentrations of the at least two metal components in the diffusion liner layer 430, generated at the exposed, non-bonded surfaces of the bonding elements 412 and 422, may be different from the concentrations of the at least two metal components in the bulk of the bonding elements 412 and 422. For example, after bonding or bonding-plus-annealing, since the secondary metal component may have migrated to the non-bonded surfaces of the first bonding element 412 and the second bonding element 422, the concentration of the secondary metal component contained in the alloy in the bulk of the first bonding element 412 and the second bonding element 422 may be lower. In an exemplary embodiment of the disclosure, when one metal component (for example, the secondary metal component) of the alloy in the bonding elements 412 and 422 may be, for example, about 5% or less by weight, the one metal component (the secondary metal component) in the self-forming diffusion liner layer 430 may be, for example, at least greater than 95%.

Figure 5A:
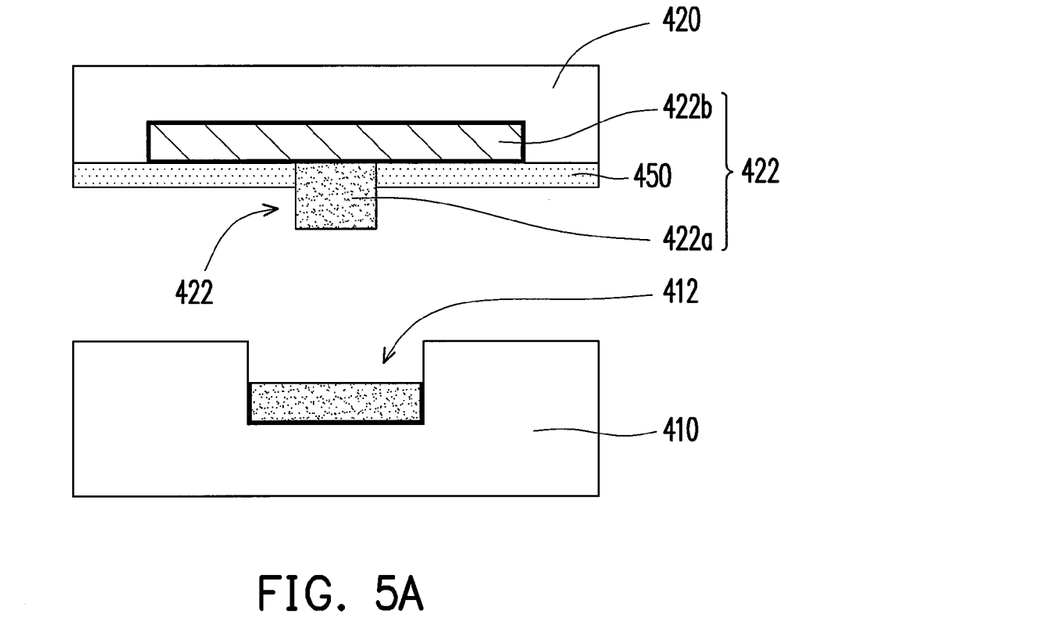
FIGS. 5A and 5B are schematic cross-sectional views illustrating a process of fabricating a bonding structure according to an exemplary embodiment of the disclosure.
Figure 5B:
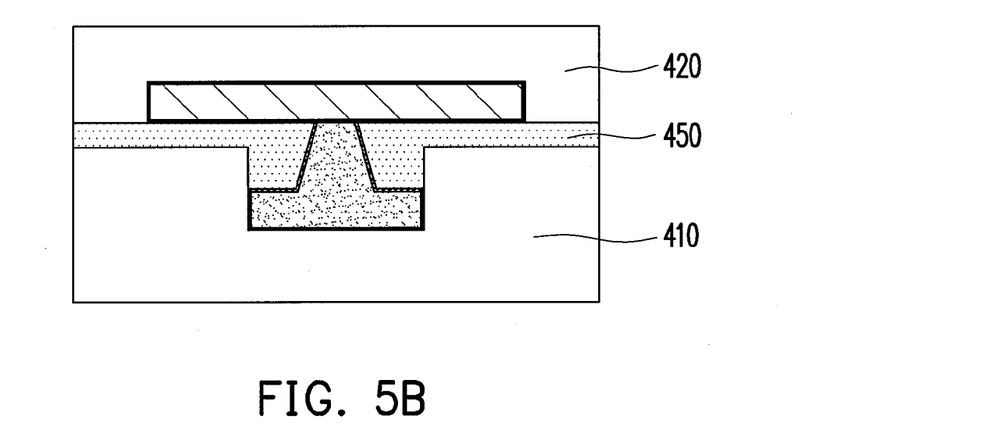

In accordance to the exemplary embodiment, an adhesive film 450 may be applied on the top surface 420a of the second substrate 420 prior to the bonding process, as shown in FIG. 5A. According to this exemplary embodiment of the disclosure, the adhesive film 450 is formed on the lateral portion 422b of the second bonding element 422 and the top surface 420a of the first substrate 420, surrounding the stud 422a. Hence, subsequent to the bonding process, as shown in FIG. 5B, the gap between the first substrate 410 and the second substrate 420 is filled with the adhesive film 450 to better improve the bonding strength and integrity of the bonding structure.

The bonding structure in the exemplary embodiments of the disclosure is designed to have a self-forming diffusion liner layer configured at the exposed, non-bonded surface of the bonding structure. The self-forming diffusion liner is generated, during the formation of the bonding interface, with the intrinsic components of the bonding elements used in forming the bonding structure. Through the self-forming diffusion liner layer provided by the disclosure, interaction between the metal, such as copper, of the bonding structure and the ambient environment, such as air or adhesive, which may cause damages to the metal, can be prevented. Moreover, the problems of stress-induced voiding and electromigration that are often occurred in an exposed bonding structure are mitigated. Generally speaking, the bonding structure in the exemplary embodiments of the disclosure is provided with good resistance to oxidation, electromigraion and stress-induced voiding, etc. Accordingly, the reliability of a bonding structure and the final device is improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A bonding structure, comprising:
   a copper stud;
   a copper-based alloy having a flat top surface and bonded to a bottom surface of the copper stud, wherein the flat top surface has a surface area larger than a surface area of the bottom surface of the stud, and the flat top surface includes a bonding area between the copper stud and the copper-based alloy, the bonding area occupying a central portion of the flat top surface, and a nonbonding area surrounding the bonding area, wherein the copper-based alloy includes a principle component being copper and a secondary component including an element selected from a group consisting of titanium, magnesium, and aluminum; and
   a self-forming diffusion liner configured on the top surface of the nonbonding area of the copper-based alloy, wherein the self-forming diffusion liner includes the principle component and the secondary component included in the copper-based alloy, and a weight percentage of the secondary component in the self-forming diffusion liner is higher than a weight percentage of the secondary component in the copper-based alloy.

2. The bonding structure of claim 1, wherein a weight percentage of copper in the copper-based alloy is about 99.5% to about 95%.

3. The bonding structure of claim 1, further comprising:
a top substrate;
a copper portion configured on top of the copper stud and embedded in the top substrate;
a first liner configured between the copper portion and the top substrate;
a bottom substrate having a recess, wherein the copper-based alloy is configured in a bottom of the recess, and the flat top surface of the copper-based alloy is lower than a top surface of the bottom substrate; and
a second liner configured between the copper-based alloy and the bottom substrate.

4. The bonding structure of claim 3, further comprising an adhesive film configured between the top substrate and the bottom substrate.

5. The bonding structure of claim 3, further comprising:
a top substrate;
a copper portion configured on top of the copper stud and embedded in the top substrate;
a first liner configured between the copper portion and the top substrate;
a bottom substrate having a recess, wherein the copper-based alloy is configured in a bottom of the recess, and the flat top surface of the copper-based alloy is lower than a top surface of the bottom substrate; and
a second liner configured between the copper-based alloy and the bottom substrate.

6. The bonding structure of claim 5, further comprising an adhesive film configured between the top substrate and the bottom substrate.

7. A bonding structure, comprising:
a copper-based alloy stud;
a copper-based alloy bonding element having a flat top surface and bonded to a bottom surface of the copper-based alloy stud, wherein the flat top surface has a surface area larger than a surface area of the bottom surface of the copper-based alloy stud, the flat top surface including a bonding area between the copper-based alloy stud and the copper-based alloy bonding element, the bonding area occupying a central portion of the flat top surface, and a nonbonding area surrounding the bonding area, wherein a copper-based alloy in the copper-based alloy stud and the copper-based alloy bonding element includes a principle component being copper and a secondary component including an element selected from a group consisting of titanium, magnesium, and aluminum; and
a self-forming diffusion liner configured on the top surface of the nonbonding area of the copper-based alloy bonding element, and formed on an outer surface of the copper-based alloy stud, wherein the self-forming diffusion liner includes the principle component and the secondary component included in the copper-based alloy, and a weight percentage of the secondary component in the self-forming diffusion liner is higher than a weight percentage of the secondary component in the copper-based alloy.

8. The bonding structure of claim 7, wherein a weight percentage of copper in the copper-based alloy is about 99.5% to about 85%.

9. The bonding structure of claim 7, further comprising:
a top substrate;
a copper portion configured on top of the copper-based alloy stud and embedded in the top substrate;
a first liner configured between the copper portion and the top substrate;
a bottom substrate having a recess, wherein the copper-based alloy bonding element is configured in a bottom of the recess, and the flat top surface of the copper-based alloy bonding element is lower than a top surface of the bottom substrate; and
a second liner configured between the copper-based alloy bonding element and the bottom substrate.

10. The bonding structure of claim 7, further comprising an adhesive film configured between the top substrate and the bottom substrate.

11. The bonding structure of claim 7, further comprising:
a top substrate;
a copper portion configured on top of the copper-based alloy stud and embedded in the top substrate;
a first liner configured between the copper portion and the top substrate;
a bottom substrate having a recess, wherein the copper-based alloy bonding element is configured in a bottom of the recess, and the flat top surface of the copper-based alloy bonding element is lower than a top surface of the bottom substrate; and
a second liner configured between the copper-based alloy bonding element and the bottom substrate.

12. The bonding structure of claim 11, further comprising an adhesive film configured between the top substrate and the bottom substrate.

13. A bonding structure between a copper-based alloy stud and a metal, comprising:
a copper-based alloy stud, wherein the copper-based alloy stud includes a principle component being copper and a secondary component including an element selected from a group consisting of titanium, magnesium, and aluminum;
a metal bonding element having a flat top surface and bonded to a bottom surface of the copper-based alloy stud, wherein the flat top surface has a surface area larger than a surface area of the bottom surface of the copper-based alloy stud, the flat top surface including a bonding area between the copper-based alloy stud and the metal bonding element, the bonding area occupying a central portion of the flat top surface, and a nonbonding area surrounding the bonding area; and
a self-forming diffusion liner formed on an outer surface of the copper-based alloy stud, wherein the self-forming diffusion liner includes the principle component and the secondary component included in the copper-based alloy stud, and a weight percentage of the secondary component in the self-forming diffusion liner is higher than a weight percentage of the secondary component in the copper-based alloy stud.

14. The bonding structure of claim 13, wherein a weight percentage of copper in the copper-based alloy stud is about 99.5% to about 85%.

15. The bonding structure of claim 13, further comprising:
a top substrate;
a copper portion configured on top of the copper-based alloy stud and embedded in the top substrate;
a first liner configured between the copper portion and the top substrate;
a bottom substrate having a recess, wherein the metal bonding element is configured in a bottom of the recess, and the flat top surface of the metal bonding element is lower than a top surface of the bottom substrate; and a second liner configured between the metal bonding element and the bottom substrate.

16. The bonding structure of claim 13, further comprising an adhesive film configured between the top substrate and the bottom substrate.

17. The bonding structure of claim 13, further comprising:

a top substrate;

a copper portion configured on top of the copper-based alloy stud and embedded in the top substrate;

a first liner configured between the copper portion and the top substrate;

a bottom substrate having a recess, wherein the metal bonding element is configured in a bottom of the recess, and the flat top surface of the metal bonding element is lower than a top surface of the bottom substrate; and a second liner configured between the metal bonding element and the bottom substrate.

18. The bonding structure of claim 17, further comprising an adhesive film configured between the top substrate and the bottom substrate.

\* \* \* \* \*